United States Patent [19]

Hujsak

[11] Patent Number: 4,830,314

[45] Date of Patent: May 16, 1989

[54] RECOVERY SYSTEM FOR ROCKET ENGINE

[75] Inventor: Edward J. Hujsak, La Jolla, Calif.

[73] Assignee: General Dynamics Corp./Space Systems Division, San Diego, Calif.

[21] Appl. No.: 147,964

[22] Filed: Jan. 25, 1988

[51] Int. Cl.$^4$ ............................................. B64G 1/40
[52] U.S. Cl. ................................. 244/172; 244/160; 102/377; 102/378
[58] Field of Search ................. 244/172, 160, 158 R; 102/377, 378

[56] References Cited

U.S. PATENT DOCUMENTS

| | | | |
|---|---|---|---|
| 3,092,027 | 6/1963 | Price | 102/377 |
| 3,224,370 | 12/1965 | Vogt | 102/377 |
| 3,606,212 | 9/1971 | Paine | 244/160 |
| 4,451,017 | 5/1984 | Marshall | 244/172 |

FOREIGN PATENT DOCUMENTS 2136129 1/1981 Fed. Rep. of Germany ...... 244/172

Primary Examiner—Joseph F. Peters, Jr.
Assistant Examiner—Rodney Corl
Attorney, Agent, or Firm—John R. Duncan; Frank D. Gilliam

[57] ABSTRACT

The disclosure is directed to a system for recovery of liquid fuel rocket engines used in space flight. The system comprises a sphere with a normally circumferential open portion for containing a rocket engine. The sphere is fixedly attached to the space vehicle. The engine is attached to the inner surface of the sphere in a manner allowing normal engine functions including but not limited to gimbaling. The normal engine hookup is provided via disconnects on the outer surface of the sphere. A pair of sphere closure sections are carried on rails within the sphere adjacent to the normally open portion of the sphere. When the use of the engine in space flight is completed generally prior to vehicle orbit, actuation devices translate the closure sections into the normally open portion of the sphere sealing the opening thereby forming an integral closed sphere, the sphere containing the engine is disconnected from the vehicle by explosive bolts or the like and then the sphere falls from the vehicle towards earth. After reaching the earth's atmosphere, a parachute is deployed to slow the falling speed of the sphere. The sphere can be recovered by air or sea recovery and the system can be reused.

7 Claims, 3 Drawing Sheets

RECOVERY SYSTEM FOR ROCKET ENGINE

BACKGROUND OF THE INVENTION

The invention is directed to space vehicles and more particularly to the recovering of the liquid fuel engines from space vehicles for reuse.

Liquid fuel rocket engine or engines are very expensive to manufacture, in some instances the cost of the engines exceed the cost of the balance of the vehicle. Obviously a great cost saving could be achieved if the engines could be recovered for reuse.

Although vehicles like the space shuttle are able to return to earth with their engine or engines intact for reuse there has been no attempt to recover the liquid fueled booster engines used to place satellites and like vehicles into orbit.

There is considerable effort by N.A.S.A. to achieve recovery of propulsion modules by means of fly back propulsion systems. These systems being studied have very high costs associated therewith due to the fact that the modules require guidance, navigation equipment and ground crew support.

There has not been an inexpensive means for recovering expensive booster engines until the emergence of this invention.

SUMMARY OF THE INVENTION

The invention comprises the use of a sphere which houses a conventional liquid fuel booster or rocket engine mounted therein. The sphere includes a normally open circumferential surface through which the propulsion gases of the engine are directed. The engine is mounted to the inner surface of the sphere opposite to the opening so that it can function in a normally required manner, ie. the engine can be gimbaled in a normally expected manner. A pair of closure doors shaped to fill the circumferential opening in the sphere when positioned therein are stored within the sphere adjacent to the opening during normal flight conditions. After the flight use of the engines is complete, motors are energized which translate the doors across and into the opening. Track means are used to guide the translation of the doors. Sealing means is employed to seal the seams between the doors and the body of the sphere adjacent to the door engagement from moisture penetration.

After the doors are translated and sealed to the body of the sphere, the sphere is caused to separate from the vehicle. Commonly available explosive bolts which are normally used for component separation in space vehicle flight may be employed. Other convenient and known means may be used to disconnect the sphere from the vehicle.

After the sphere enters the earth's atmosphere, parachutes can be deployed to slow the free fall of the sphere. The sphere may then be recovered from its slowed free fall by aircraft or recovered from the surface of water or land.

The principle object of this invention is to provide a system for the recovery of liquid fuel booster engines after a flight for their reuse.

Another object of this invention is to provide a sphere for encompassing a space vehicle engine which can be sealed to protect the engine from damage when reentering the earth's atmosphere and/or water landings.

Another objective of the invention is to provide a freely rotating spherical shape through which heating of the surface during reentry is minimized by constantly changing the treated area.

Yet another objective is to provide a spherical reentry shape whereby landing spots are accurately predicted without use of guidance of navigation equipment.

Still another object of the invention is to provide a translating system for translating the closure doors to a position for sealing the normally open surface of the sphere.

These and other objects and advantages of the invention will be set forth in the following description made in connection with the accompanying drawings in which like reference characters refer to similar elements or parts throughout the several views and in which:

BRIEF DESCRIPTION OF THE DRAWING FIGURES

DETAILED DESCRIPTION OF THE PREFERRED EMBODIMENT

Figure 1:
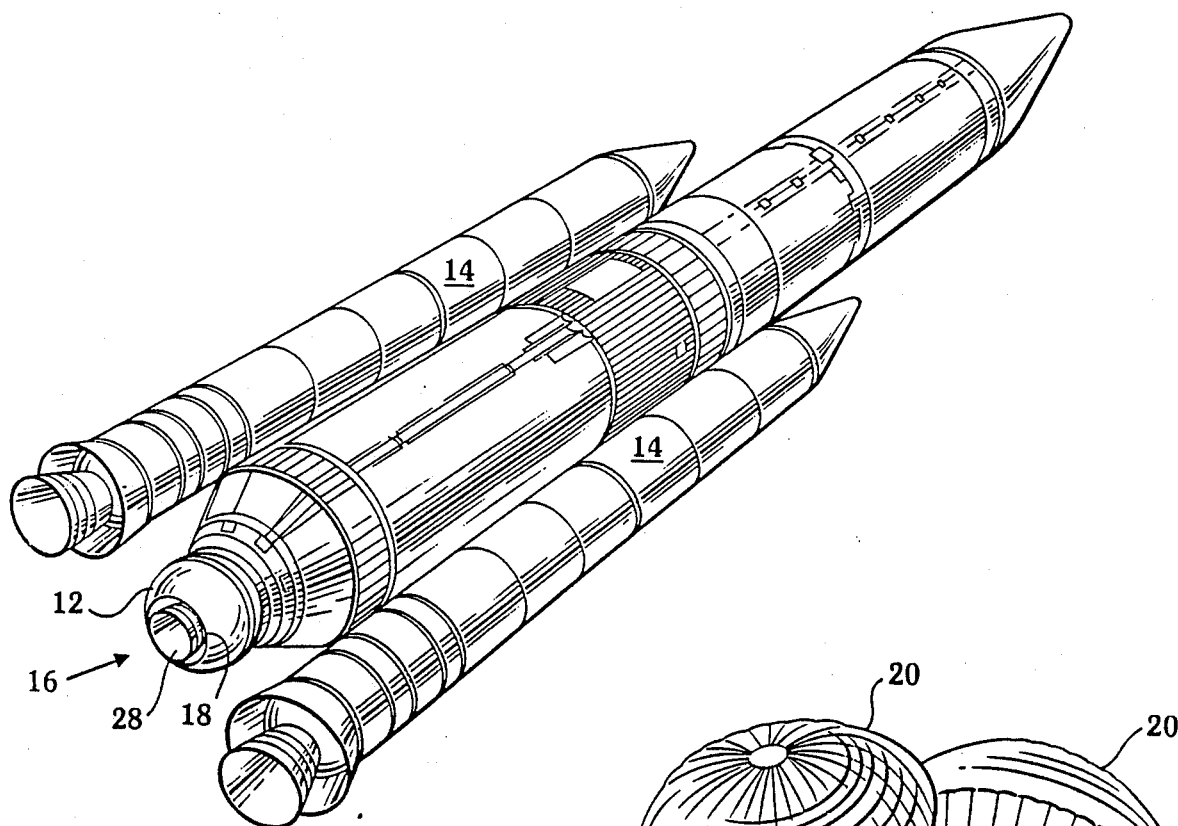
FIG. 1 is a perspective showing depicting a space vehicle in flight employing the present invention.

Referring now to the various drawing figures, FIG. 1 depicts a space vehicle 10 in flight equipped with the engine recovery sphere 12 of the invention. The vehicle is shown with two booster engines 14 one of which is attached on each side of the space vehicle and a main liquid fuel engine 16. The booster engines are jettisoned early in flight after burn out and the main liquid fuel engine sustains continued vehicle flight. The booster engines are shown to be the solid fuel type and are not specifically included in the discussion of the main liquid fuel engine recovery system of the invention. Obviously the booster engines could be recovered for future use according to the following discussion directed specifically to the recovery of the liquid fuel engine. Presently, the liquid fuel engine remains attached to the space vehicle and both vehicle and engine are destroyed upon entry into the earth's atmosphere.

As can be seen in FIG. 1, the liquid fuel engine 16 is carried in a sphere 12 which has an opening 18 which allows the propulsion gases to exit in a rearly direction. The sphere is attached to the space vehicle 10 in a manner which allows for separation therefrom at a selected time. Generally separation is accomplished by means of explosive bolts or other controllable means conveniently employed for this purpose as commonly employed for the jettisoning of spent vehicle stages.

Figure 2:
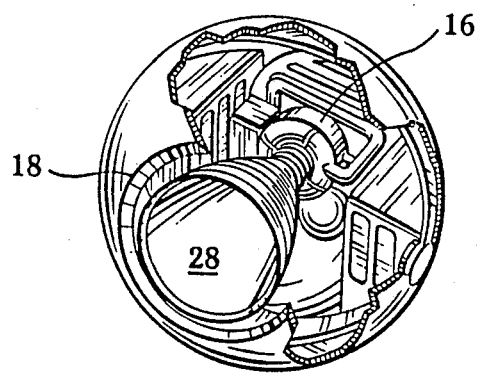
FIG. 2 is an enlarged showing of the sphere of the invention in partial cutaway containing a liquid fuel rocket engine.

FIG. 2 is an enlarged cutaway showing of the liquid fuel engine 16 within sphere 12 of FIG. 1. The location of the liquid fuel engine therein and the propulsion gases opening 18 therethrough are shown in detail.

Figure 3:
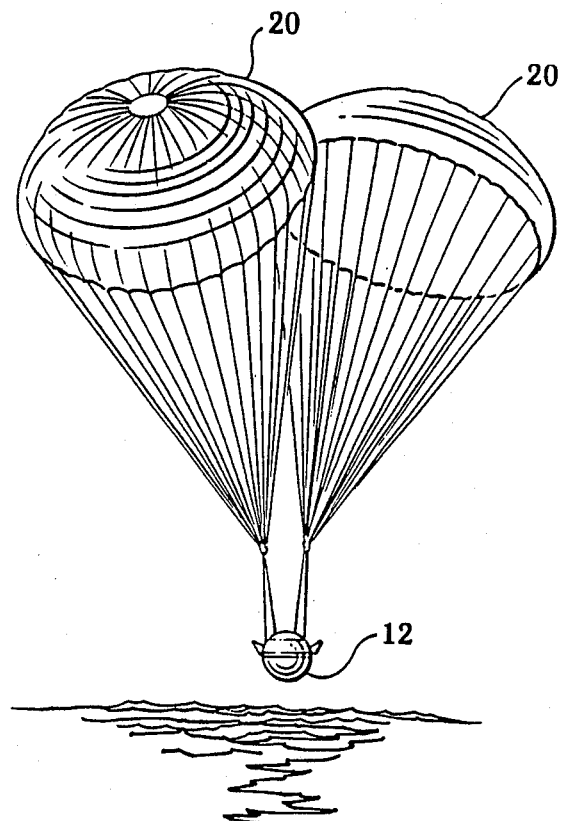
FIG. 3 is a schematic showing a sphere of the invention being lowered to earth by parachutes.

FIG. 3 shows the sphere of the invention being lowered to the earth's surface by parachutes 20.

Figure 4:
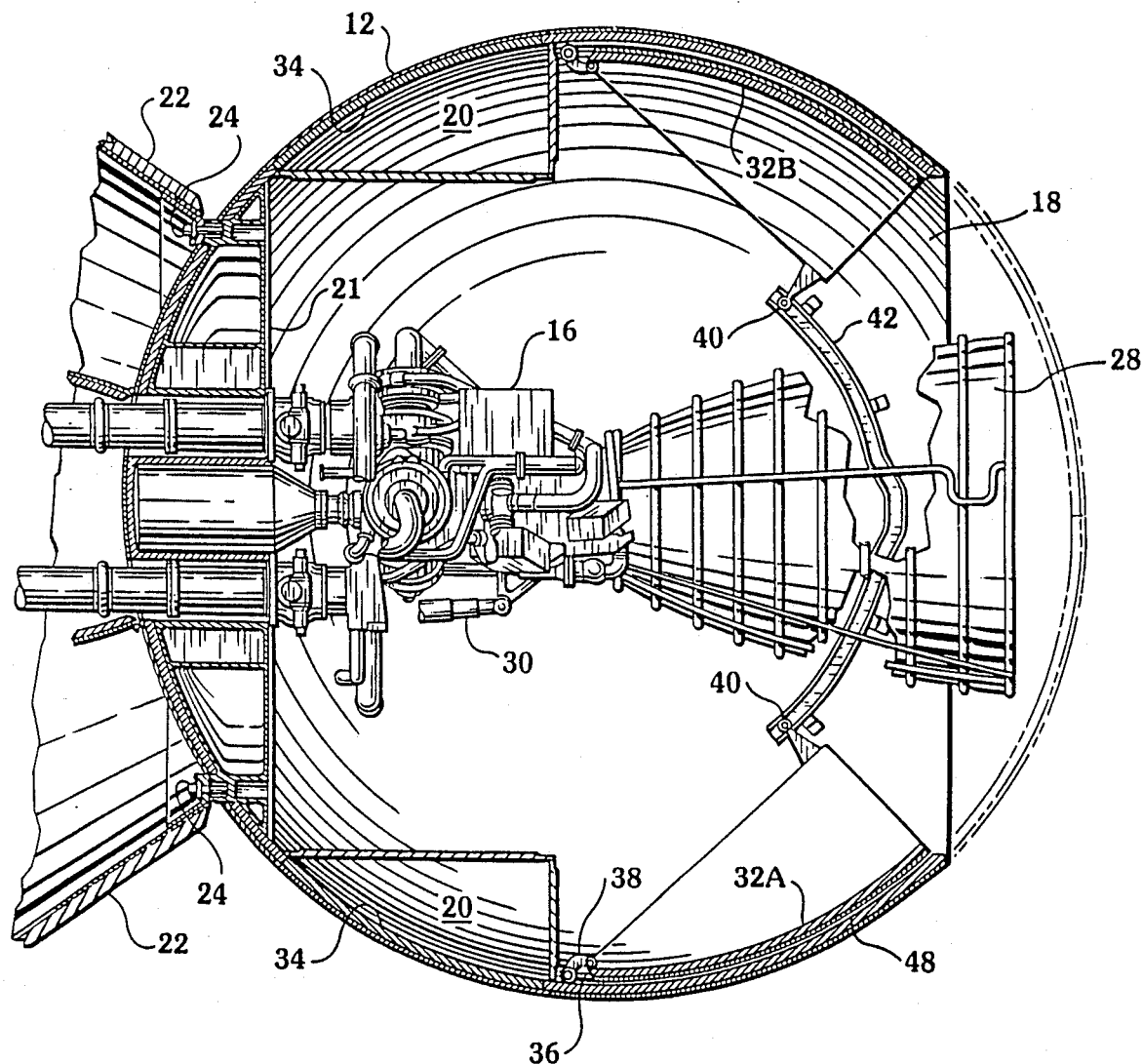
FIG. 4 is a plain cutaway showing of the sphere, contents and closure door operating mechanism.
Figure 5:
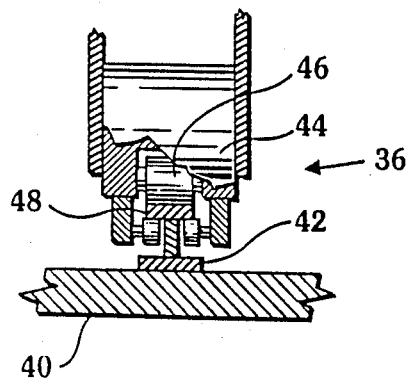
FIG. 5 is a detailed showing taken along line 5—5 of FIG. 4.
Figure 6:
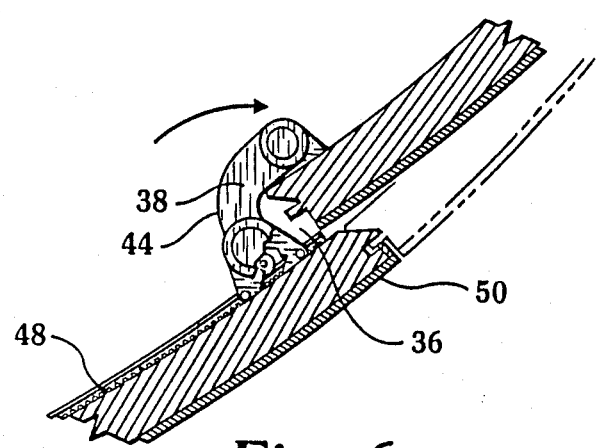
FIG. 6 is a detailed showing taken along line 6—6 of FIG. 4.

Referring now specially to FIGS. 4 through 6, FIG. 4 is a plan cutaway showing of the sphere 12 and contents. The rear portion of the sphere includes an engine support which is attached to the rear bulkhead of the vehicle through brackets 22 by attachment thereto by explosive bolts or the like 24 to initiate a disconnect at a selected time between the vehicle and sphere. The liquid fuel for engine operation is connected to vehicle fuel tanks (not shown) through umbilical disconnects adjacent to the rear of the engine at the surface of the sphere. Electrical and instrumentation for engine are connected through a like umbilical (not shown). The front of the engine includes a thrust nozzle 28 which is positioned in the opening 18 at the rear of the sphere (the end away from the vehicle to sphere attachment). The opening is made sufficiently large so as not to interfere with the thrust gas exit at any gimbal position of the nozzle. Engine gimbaling is accomplished by engine actuators 30 in a conventional and known manner. Under normal flight conditions, the opening in the rear of the sphere is as open as shown by the solid line defining the sphere surface.

A pair of translatable doors 32A and 32B are positioned with one on each side of the opening along the inner wall 34 of the sphere. These doors when translated seal the opening the sphere. The solid showing of the doors in FIG. 4 depicts their open position and the phantom showing in the same Figure depicts their closed position. On the end of the doors is a drive assembly 36 which includes a pivotal attachment member 38 for attachment between the door and drive assembly.

The upper and lower forward portions of the doors include rollers 40 which roll along adjacent tracks 42 fixedly attached to the sphere for translation guidance during closure. Closure translation is accomplished by means of a motor 44 driving a pinion 46 which engages a rack 48 fixed in position to the inside surface of the sphere. Details of the drive system can be seen in FIG. 5 and the pivotal attachment between the drive assembly and door can be seen in FIG. 6. A flexible moisture seal member 50 is carried by the door along all edge surfaces. The seal member engages the edges of the sphere opening and frictionally engages the edge surfaces of the opening when the doors are translated into the opening thereby sealing the adjacent surfaces.

Figure 7:
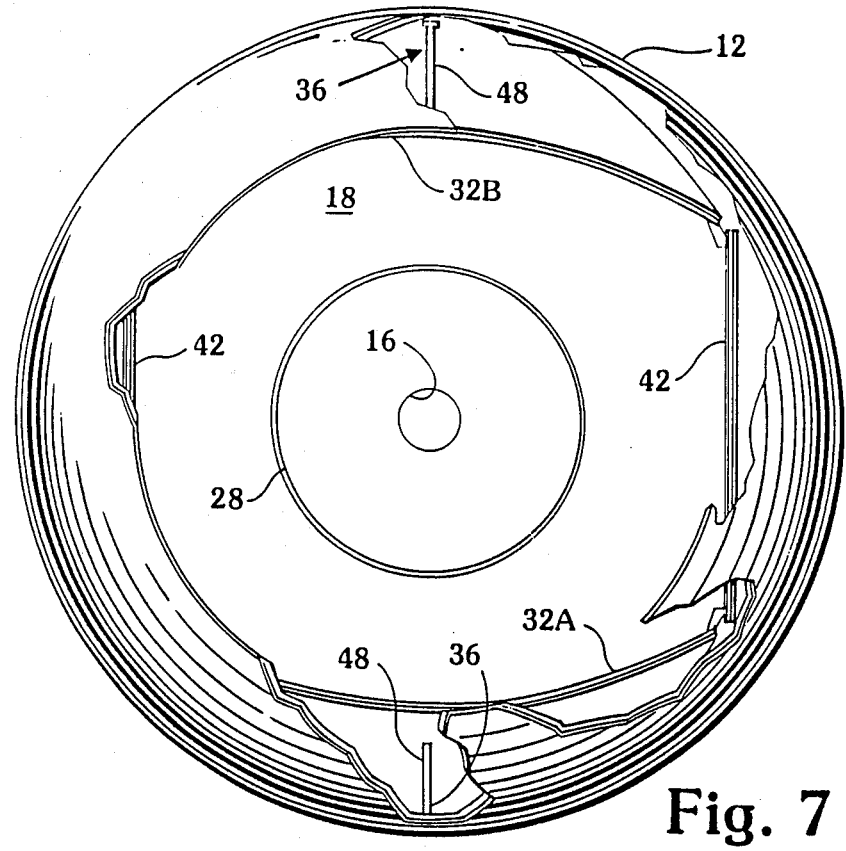
FIG. 7 is a front view showing of FIG. 4 showing the door closure mechanism in phantom.
Figure 8:
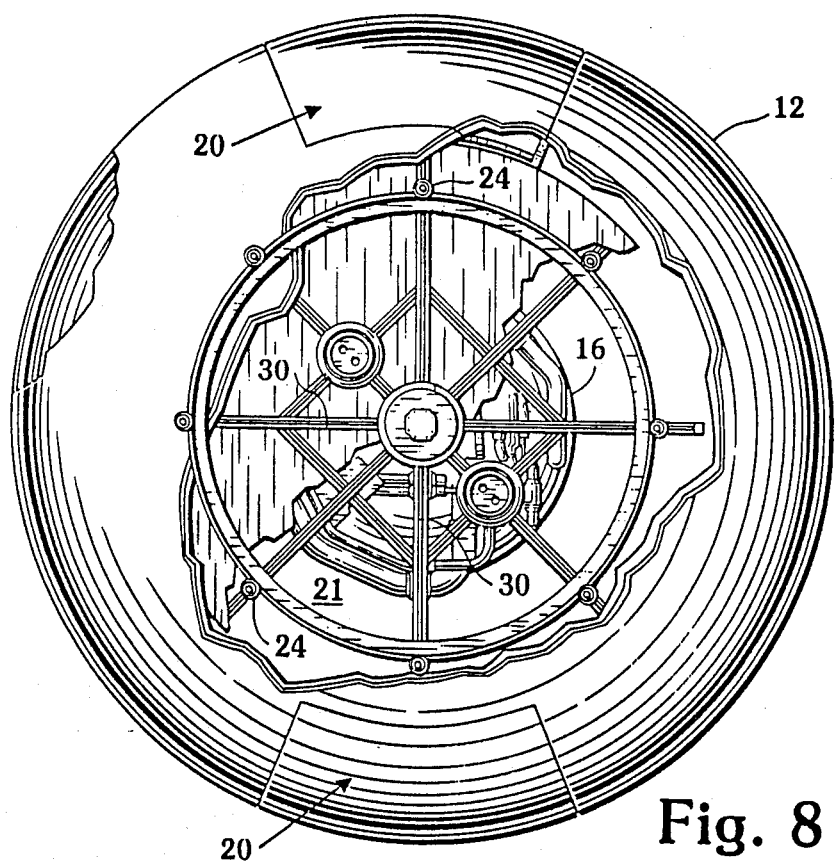
FIG. 8 is a rear showing of FIG. 4 showing the power disconnects and the back of the engine in phantom.

FIG. 7 is a showing of the end of the sphere 12 having the opening 18 through which the propulsion gasses exit as shown by solid lines and the doors and track mechanism shown by phantom lines.

In operation, the doors are caused to translate along tracks by activation of motor 44. It should be apparent that as the doors translate toward their phantom closed position as shown in FIG. 4, the offset in the tracks begining at location 52 cause the doors to translate outwardly at the end of their translation so as to make a flush outer circumferential surface with the outer surface of the sphere when they are fully closed. The seal provides a moisture seal when the doors are fully translated.

It will of course be understood that various changes may be made in form, details, arrangement, and proportions of the parts without departing from the scope of the invention herein which, generally stated, consists of an apparatus capable of carrying out the objects above set forth, in the parts and combinations of parts disclosed and defined in the append claims.

What is claimed is:

1. A system for recovery of an engine from a space vehicle for reuse comprising:
    a sphere adapted to be attached to a space vehicle, said sphere having an open surface opposite from the space vehicle attachment;
    said engine being fixedly mounted within said sphere and includes a nozzle which when said engine is mounted within said sphere is directed toward said opening in said sphere regardless of the engines gimbaled position relative to the sphere to vehicle mounting;
    a pair of closure doors being translatably carried by said sphere; and
    translation means for selectively translating said pair of doors into said opening in said sphere whereby said pair of doors form a smooth closed continuation of the outer surface of said sphere.

2. The invention as defined in claim 1 wherein said sphere is separatable from said space vehicle.

3. The invention as defined in claim 2 wherein said sphere is separatable from said space vehicle only after said pair of doors have closed said opening in said sphere.

4. The invention as defined in claim 2 wherein said sphere is attached to said vehicle by means of explosive bolts.

5. The invention as defined in claim 1 wherein said pair of closure doors are sphere segments which conform to the circumference of said sphere when positioed within said open surface.

6. The invention as defined in claim 1 wherein said translation means comprises a motor driven pinion gear carried by each of said pair of closure doors, rack means carried by said sphere for engaging each of the pinion gears for relative movement therebetween and track and roller means for guiding said pair of closure doors into position within said opening.

7. The invention as defined in claim 6 wherein said translation means additionally comprises sealing means for sealing the pair of closure doors to said sphere to provide a moisture tight seal therewith.

* * * * *